United States Patent [19]

Kuroda

[11] Patent Number: 5,638,712
[45] Date of Patent: Jun. 17, 1997

[54] DOOR LOCK DEVICE WITH ANTI-THEFT MECHANISM

[75] Inventor: Katsuya Kuroda, Yamanashi-ken, Japan

[73] Assignee: Mitsui Kinzoku Kogyo Kabushiki Kaisha, Tokyo, Japan

[21] Appl. No.: 497,256

[22] Filed: Jun. 30, 1995

[30] Foreign Application Priority Data

Jun. 30, 1994 [JP] Japan .................................. 6-171661

[51] Int. Cl.⁶ .................................................. E05B 43/00
[52] U.S. Cl. ..................... 70/268; 70/264; 70/271; 70/277
[58] Field of Search ...................... 70/262–265, DIG. 30, 70/277, 283, 267–271, 264

[56] References Cited

U.S. PATENT DOCUMENTS

| | | | |
|---|---|---|---|
| 4,440,006 | 4/1984 | Kleefeldt | 70/264 |
| 4,805,427 | 2/1989 | Bates et al. | 70/264 |
| 4,978,154 | 12/1990 | Kleefeldt et al. | 292/201 |
| 5,168,733 | 12/1992 | Rathmann et al. | 70/264 |
| 5,309,743 | 5/1994 | Kokubu et al. | 70/264 X |
| 5,428,978 | 7/1995 | Tsukano | 70/276 X |

FOREIGN PATENT DOCUMENTS 2034802  6/1980  United Kingdom .

*Primary Examiner*—Lloyd A. Gall
*Attorney, Agent, or Firm*—Browdy and Neimark

[57] ABSTRACT

A door lock device comprises a latch mechanism, an opening lever connected to door opening handles, a lock lever connected to a door key cylinder and an inside locking button, an anti-theft mechanism being displaceable between an anti-theft position for disabling an unlocking operation of the inside locking button and a canceling position for enabling the unlocking operation of the inside locking button, a motor for displacing the anti-theft mechanism, a controller for controlling the motor, and a sensor for detecting a locking operation of the key cylinder. When the sensor continuously detects the locking operation of the key cylinder during a predetermined period, the controller puts the anti-theft mechanism into the anti-theft position by operating the motor.

3 Claims, 3 Drawing Sheets

5,638,712

DOOR LOCK DEVICE WITH ANTI-THEFT MECHANISM

BACKGROUND OF THE INVENTION

1. Field of The Invention

The present invention relates to a vehicle door lock device provided with an anti-theft mechanism. The anti-theft mechanism is also called a super-lock mechanism or a deadlock mechanism.

2. Description of The Related Art

A previously known vehicle door lock device has a lock lever which is turned between a locked position and an unlocked position by either operating a door key cylinder mounted on the outer surface of the door, or an inside locking button mounted on the inner surface of the door. The conventional lock lever is sometimes displaced to the unlocked position illegally by gripping the locking button by means of a gripping tool inserted between the door and a vehicle body without a door key.

As countermeasures against such an illegal act, many conventional anti-theft mechanisms for canceling the connection between the inside lock button and the lock lever have been proposed.

FIG. 4 is a schematic diagram for illustrating the configuration of a lock device provided with an anti-theft mechanism, which is described in U.S. Pat. No. 4,978,154. This conventional lock device has a lock lever A rotatably supported on a shaft C and adapted to be displaced between a locked position and an unlocked position; an anti-theft member B adapted to be displaced between an anti-theft position and a canceling position by sliding in the left and right direction; a button lever F connected to an inside locking button G and adapted to be turned together with the anti-theft member B; and a switching lever H perforated with an elongated hole I in which a projection D of the member B is engaged. When the anti-theft member B is in the anti-theft position as shown in FIG. 4, the projection D of the member B is disengaged from a forked portion E of the lock lever A. Thus, even if the button lever F and the anti-theft member B are turned clockwise by operating the inside locking button G, the projection D can not cause the lock lever A to turn to the unlocked position. When canceling an anti-theft condition, the anti-theft member B is slid to the right by turning the switching lever clockwise, so that the projection D of the anti-theft member B is engaged with the forked member E. Then, the anti-theft member B is connected with the lock lever A. Consequently, the inside locking button G comes to be able to cause the lock lever A to turn to the unlocked position.

In each case of many anti-theft mechanism conventionally proposed, the anti-theft member will be displaced under power of a motor. There are two methods by which the motor is activated or operated. One of the methods is that a controller operates the motor for displacing the anti-theft member to the anti-theft position when turning the door key cylinder to the locked position. A problem for this method is that the anti-theft member is automatically put in the anti-theft position when the lock lever is changed to the locked position by use of a door key. Namely, in the case of employing this method, it becomes impossible to change only the position of the lock lever without moving the anti-theft member.

The other method is to establish in the door key cylinder a special position for an anti-theft operation. The controller operates the motor for changing the anti-theft member to the anti-theft position only when the key cylinder is turned to the special position or anti-theft position. In the case of employing the latter method, a driver can freely select one of a normal locked condition in which the lock lever and the anti-theft member are in the locked position and the canceling position, respectively, and an anti-theft locked condition in which the lock lever in the locked position and the anti-theft member in the anti-theft position.

The latter method, however, has a problem in that not many malfunctions occur. As shown in FIG. 5, the door key cylinder to be used in performing the latter method has the special position or anti-theft position in addition to three conventional positions which ordinary key cylinders have, namely, a locked position, an unlocked position and a neutral position provided therebetween. This anti-theft position is established beyond the locked position. Thus, if the driver wishes for a normal lock, the key cylinder is turned to the locked position but should not be turned beyond the locked position. However, many malfunctions do occur when turning the key cylinder beyond the locked position.

SUMMARY OF THE INVENTION

Accordingly, an object of the present invention is to provide a door lock device provided with an anti-theft mechanism, by which one of the normal locked condition and the anti-theft locked condition can be selected according to a driver's wish and an occurrence of a malfunction can be prevented almost completely.

Other features, objects and advantages of the present invention will become apparent from the following description of preferred embodiments with reference to the drawings in which like reference characters designate like or corresponding parts throughout several views.

DETAILED DESCRIPTION OF THE PREFERRED EMBODIMENTS

Figure 1:
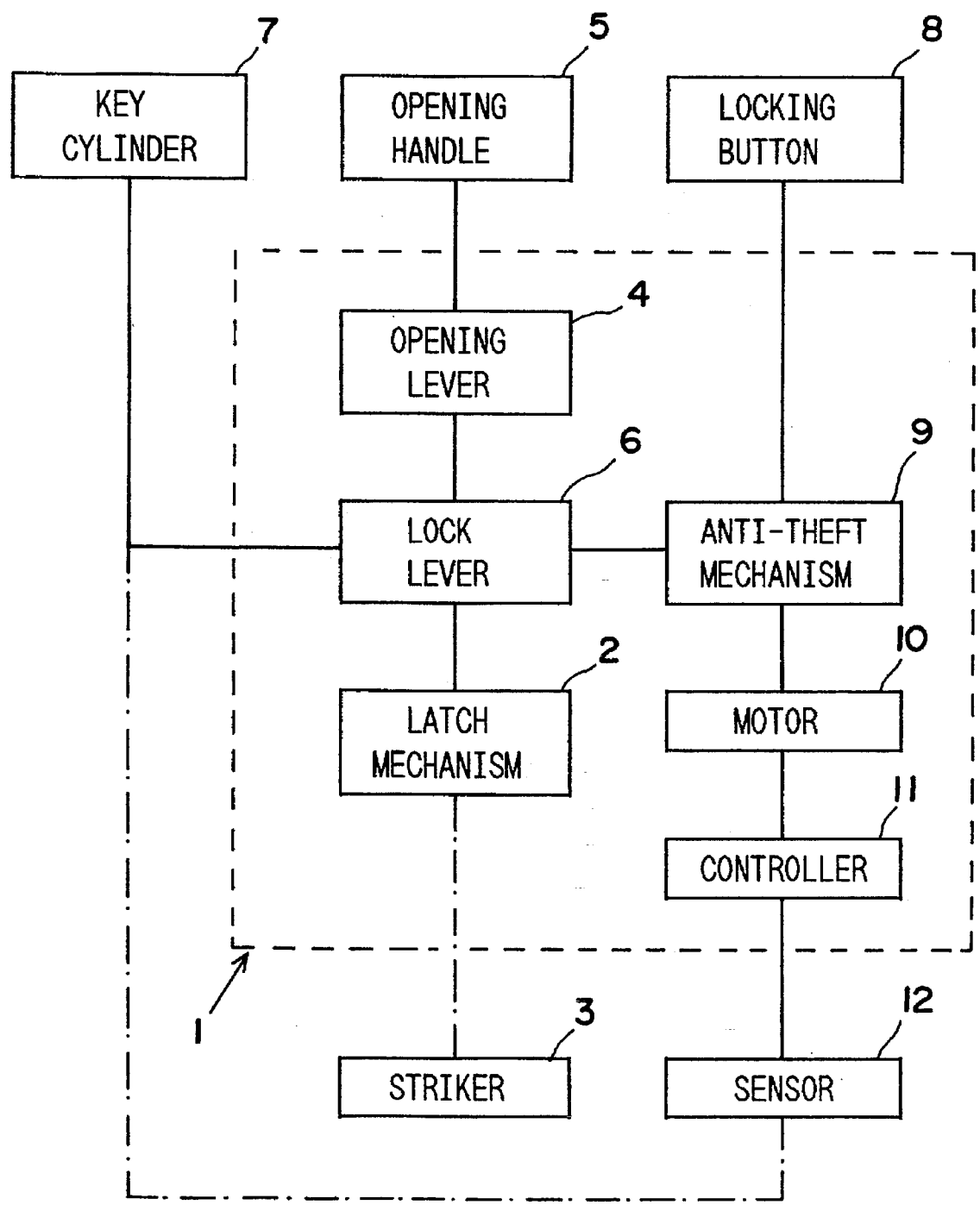
FIG. 1 is a block diagram for illustrating main components of a door lock device provided with an anti-theft mechanism, which embodies the present invention.
Figure 2:
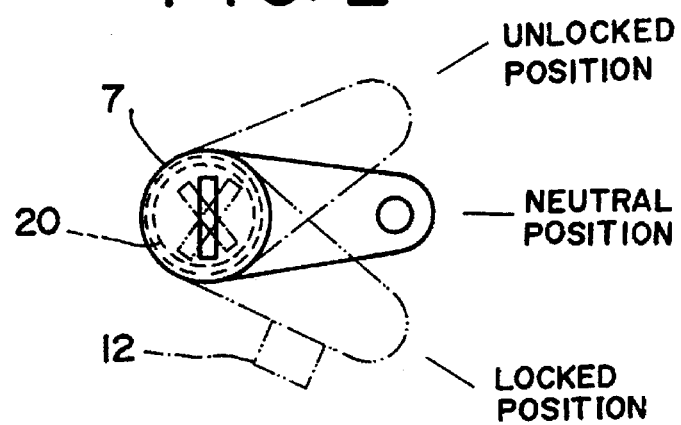
FIG. 2 is a diagram for illustrating a door key cylinder of the present invention.
Figure 5:
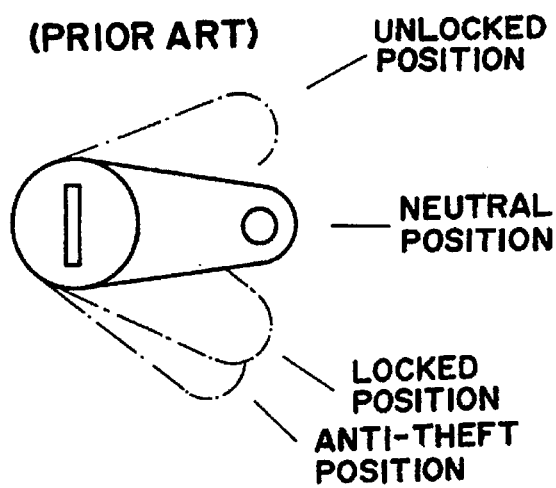
FIG. 5 is a publicly known door key cylinder.
Figure 4:
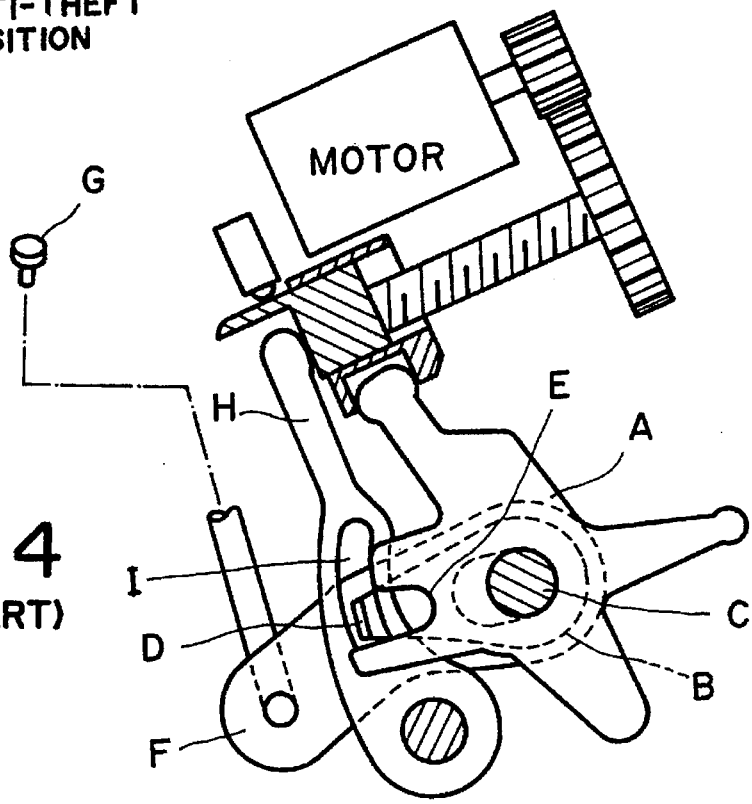
FIG. 4 is a diagram for illustrating a publicly known door lock device provided with an anti-theft mechanism.

Hereinafter, the preferred embodiments of the present invention will be described in detail by referring to the accompanying drawings. FIG. 1 is a block diagram for illustrating a door lock device provided with an anti-theft mechanism, which embodies the present invention. The door lock device 1 has a latch mechanism 2 which is engaged with a striker 3 fixed to a vehicle body (not shown), an opening lever 4 connected to inner and outer opening handles 5 mounted on the door, and a lock lever 6 which is provided between the latch mechanism 2 and the opening lever 4 and is displaceable between a locked position and an unlocked position. When the lock lever 6 is in the unlocked position, the opening lever 4 and the latch mechanism 2 are relationally connected with each other, thus turning of the opening lever 4 will cause the latch mechanism 2 to release the striker 3 and permit the door to be opened. When the lock lever 6 is in the locked position, the opening lever 4 becomes disconnected from the latch mechanism 2. Thus, the door opening operation of the opening lever 4 is not transmitted to the latch mechanism 2.

A door key cylinder 7 which is mounted on the outer surface of the door is connected to the lock lever 6 through a rod or the like. An inside locking button (or sill knob) 8 which is mounted on the inner surface of the door is also connected to the lock lever 6 through an anti-theft mechanism 9. The anti-theft mechanism 9 is displaceable under power of a motor 10 between an anti-theft position for putting the inside locking button 8 and the lock lever 6 into a disconnected condition and a canceling position for putting the inside locking button 8 and the lock lever 6 into a connected condition. Reference numeral 11 designates a controller for operating the motor 10.

The key cylinder 7 of the present invention is normally held in a neutral position by resilience of a spring 20. The key cylinder 7 is put into a locked position by turning a door key clockwise and into an unlocked position by turning the door key counterclockwise. A sensor 12 which detects the locked position of the key cylinder 7 is provided in the vicinity of the key cylinder 7 or the lock lever 6. When the key cylinder 7 is in the locked position, the sensor 12 outputs a detection signal to the controller 11 continuously. If the detection signal is continuously inputted to the controller 11 during a predetermined period, the controller 11 senses that a driver is instructing that the lock device be changed to the anti-theft locked condition. Then, the controller 11 changes the anti-theft mechanism 9 into the anti-theft position by means of the motor 10. The predetermined period of time is preferably 1 to 2 seconds or so but may be suitably changed.

Figure 3:
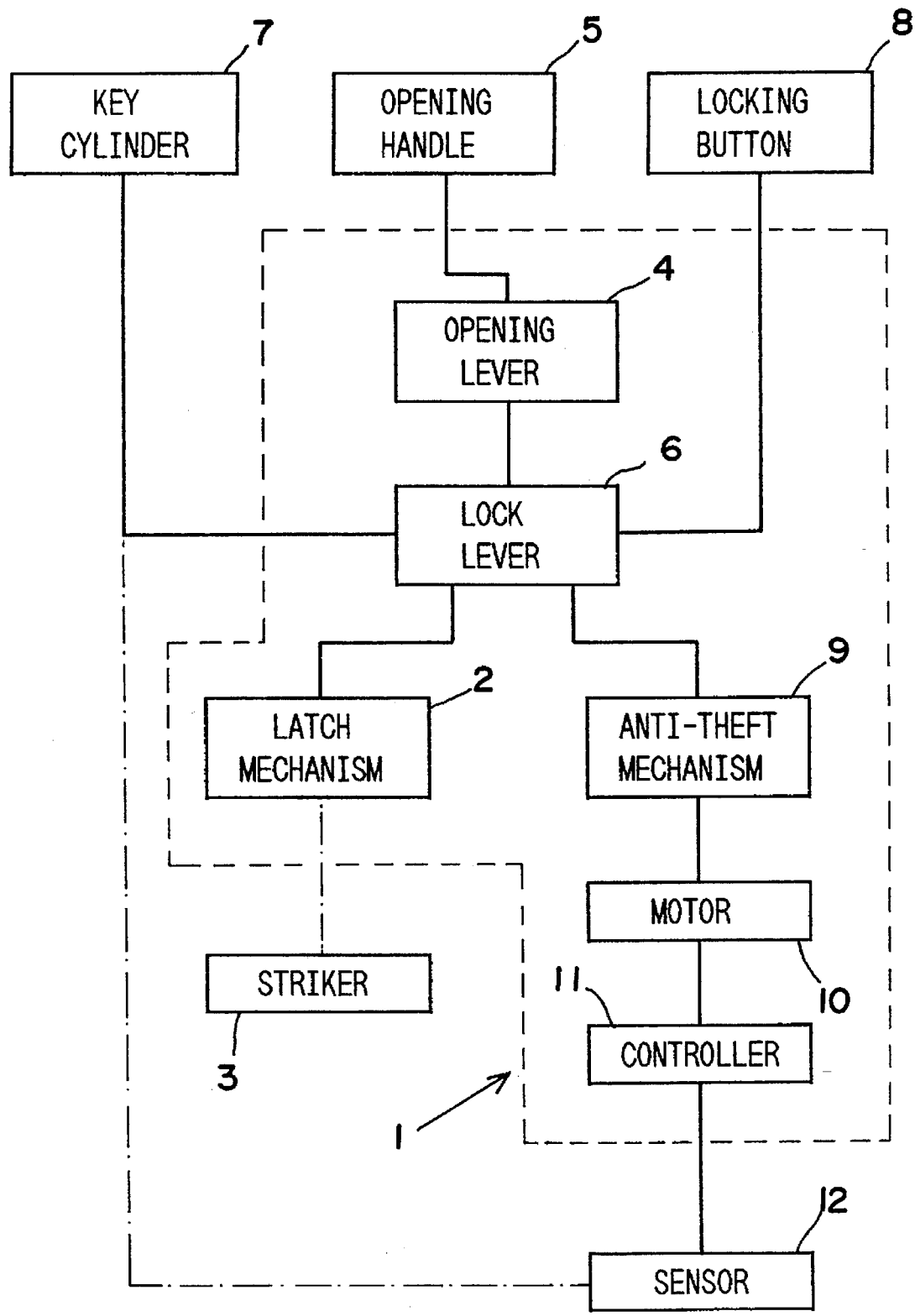
FIG. 3 is a block diagram for illustrating main components of another door lock device provided with an anti-theft mechanism, which also embodies the present invention.

Incidentally, FIG. 1 shows merely an exemplary configuration of the door lock device provided with the anti-theft mechanism. The configuration of the door lock device of the present invention is not limited to that illustrated in FIG. 1. In the case of the configuration of FIG. 1, the anti-theft mechanism 9 of the swinging type, by which no force is transmitted from the inside lock button 8 to the lock lever 6, is provided therebetween. However, in the case of employing, for example, the anti-theft mechanism 9 of the blocking type, by which the rotation of the lock lever 6 itself is blocked or inhibited, the anti-theft mechanism 9 is connected to the lock lever 6 as illustrated in FIG. 3.

Hereinafter, an operation of the door lock device embodying the present invention will be described.

When changing the condition of the lock device into the anti-theft locked condition, the key cylinder 7 is continuously turned to the locked position during a predetermined period, preferably 1 to 2 seconds, by using the door key. Thus, the sensor 12 detects the locked position of the key cylinder 7 and continuously outputs the signal to the controller 11. Thereby, the controller 11 senses that the driver is instructing that the condition of the lock device be changed to the anti-theft locked condition and then operates the motor 10 for displacing the anti-theft mechanism 9 into the anti-theft position.

When the device is put into the anti-theft locked condition, an unlocking operation of the inside locking button 8 is not transmitted to the lock lever 6. Consequently, the door cannot be opened from the inside of a vehicle.

In contrast, when the key cylinder 7 is turned to the locked position by using the door key for the purpose of normal lock operation, the force from the door key for turning the key cylinder 7 is lost within 1 second at longest. Thus, the key cylinder 7 is turned back to the neutral position by the action of a return spring 20 before the predetermined period expires. As a result, the controller 11 does not activate the motor 10, and the lock device is put into a normal locked condition in which the lock lever 6 is switched into the locked position by means of the door key operation. Consequently, it hardly even happens that the device is accidentally put into the anti-theft locked condition.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A door lock comprising:

a latch mechanism engaging with a striker fixed to a vehicle body;

an opening lever connected to a door opening handle mounted on a door for releasing the latch mechanism from the striker so as to open the door;

a lock lever connected to a door key cylinder and an inside locking button, said lock lever being displaceable by turning the door key cylinder between a locked position for disabling a door opening operation of the opening lever and an unlocked position for enabling the door opening operation of the opening lever;

an anti-theft mechanism being displaceable between an anti-theft position for disabling an unlocking operation of the inside locking button and a canceling position for enabling the unlocking operation of the inside locking button;

a motor for displacing the anti-theft mechanism between the anti-theft and canceling positions;

a controller for controlling the motor; and a sensor for detecting the locked position of the key cylinder;

wherein when the sensor continuously detects the the locked position of the key cylinder after a predetermined period, the controller puts the anti-theft mechanism into the anti-theft position by operating the motor.

2. The door lock device according to claim 1, wherein the key-cylinder is displaceable only between a locked position and unlocked position, and the key cylinder is normally held in a neutral position formed between locked and unlocked positions by resilience of a spring.

3. The door lock device according to claim 1, wherein the predetermined period is not less than 1 second.

* * * * *